United States Patent
Lin et al.

(10) Patent No.: US 9,013,385 B2
(45) Date of Patent: Apr. 21, 2015

(54) DRIVING CIRCUIT OF LCD PANEL, LCD PANEL, AND LCD DEVICE

(71) Applicant: Shenzhen China Star Optoelectronics Technology Co., Ltd, Shenzhen (CN)

(72) Inventors: Poshen Lin, Shenzhen (CN); Liangchan Liao, Shenzhen (CN); Nianmao Wang, Shenzhen (CN)

( * ) Notice: Subject to any disclaimer, the term of this patent is extended or adjusted under 35 U.S.C. 154(b) by 217 days.

(21) Appl. No.: 13/703,899

(22) PCT Filed: Nov. 5, 2012

(86) PCT No.: PCT/CN2012/084086
§ 371 (c)(1),
(2) Date: Dec. 12, 2012

(87) PCT Pub. No.: WO2014/048006
PCT Pub. Date: Apr. 3, 2014

(65) Prior Publication Data
US 2014/0091994 A1    Apr. 3, 2014

(30) Foreign Application Priority Data

Sep. 29, 2012    (CN) .......................... 2012 1 03799436

(51) Int. Cl.
*G09G 3/36*    (2006.01)
*G02F 1/1345*    (2006.01)
(Continued)

(52) U.S. Cl.
CPC ........ *G02F 1/13452* (2013.01); *G02F 1/13306* (2013.01); *G09G 3/3696* (2013.01); *G09G 3/348* (2013.01); *G09G 2300/0842* (2013.01); *G09G 2310/06* (2013.01); *G09G 2310/061* (2013.01); *G09G 2320/0233* (2013.01); *G09G 2320/0276* (2013.01)

(58) Field of Classification Search
CPC .......... G09G 3/3258; G09G 2320/045; G09G 3/3674; G09G 3/3696; G09G 3/348; G09G 2300/0842; G09G 2310/06; G09G 2310/061; G09G 2320/0276; G09G 2320/0233; G02F 1/13452; G02F 1/13306
See application file for complete search history.

(56) References Cited

U.S. PATENT DOCUMENTS

| | | | |
|---|---|---|---|
| 7,038,675 B2 | 5/2006 | Kawamura et al. | |
| 7,830,371 B2 | 11/2010 | Song et al. | |
| 2004/0070579 A1* | 4/2004 | Kurihara | 345/204 |

(Continued)

FOREIGN PATENT DOCUMENTS

| | | |
|---|---|---|
| CN | 1835061 A | 9/2006 |
| CN | 1904678 A | 1/2007 |

(Continued)

OTHER PUBLICATIONS

Zhang Honglei, The International Searching Authority written comments, Jul. 2013, CN.

*Primary Examiner* — Lixi C Simpson (57) ABSTRACT

The present disclosure discloses a driving circuit of a liquid crystal display (LCD) panel, an LCD panel, and an LCD device. The driving circuit of the LCD panel includes a compensation unit coupled with a scan line of the LCD panel and outputting N different driving voltages to different gate driver chips on a side of the panel. N is equal to a number of the gate driver chips arranged on the side of the LCD panel, as distance from the driving source of the driving voltages to the gate driver chip increases, absolute value of the driving voltage outputted by the compensation unit increases.

9 Claims, 4 Drawing Sheets

(51) Int. Cl.
 G02F 1/133 (2006.01)
 G09G 3/34 (2006.01)

(56) References Cited

U.S. PATENT DOCUMENTS

2006/0192738 A1* 8/2006 Kawamura et al. ............ 345/89
2008/0150868 A1* 6/2008 Chen et al. ..................... 345/95
2012/0223932 A1* 9/2012 Zhao et al. ..................... 345/212

FOREIGN PATENT DOCUMENTS

| CN | 101369061 A | 2/2009 |
| CN | 101593496 A | 12/2009 |
| CN | 101620832 A | 1/2010 |
| CN | 101699552 A | 4/2010 |
| CN | 102214432 A | 10/2011 |
| CN | 102682693 A | 9/2012 |
| CN | 102682694 A | 9/2012 |
| JP | 5-19719 A | 1/1993 |

* cited by examiner

FIG. 6

DRIVING CIRCUIT OF LCD PANEL, LCD PANEL, AND LCD DEVICE

This application is a national stage application of PCT application PCT/CN2012/084086 filed on Nov. 5, 2012, which is based on and claims priority to Chinese patent application 201210379436.7 filed on Sep. 29, 2012 in China. The entirety of each of the above-mentioned applications is hereby incorporated by reference herein in its entirety.

TECHNICAL FIELD

The present disclosure relates to the field of displays, and more particularly to a driving circuit of a liquid crystal display (LCD) panel, an LCD panel, and an LCD device.

BACKGROUND

Figure 1:
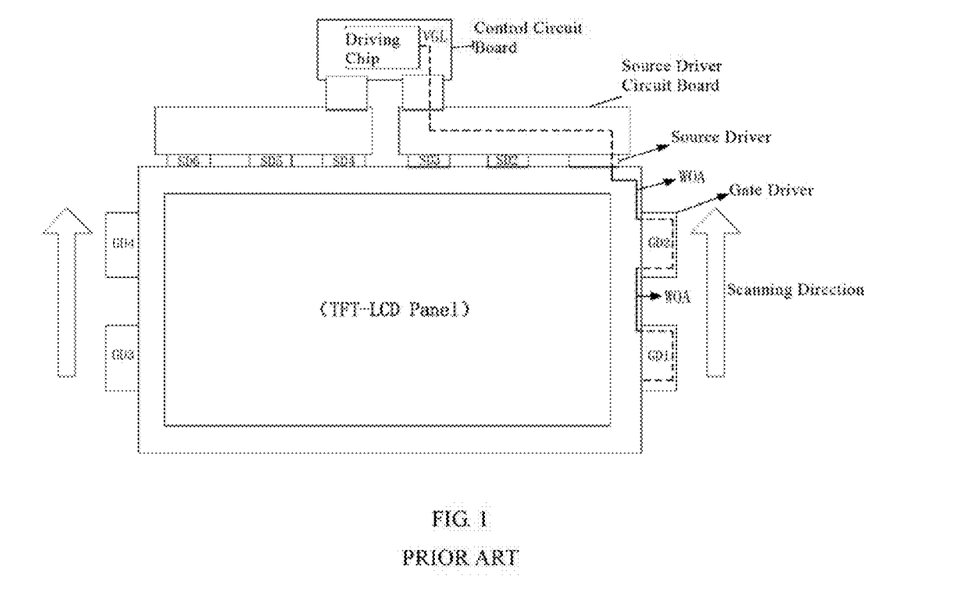
FIG. 1 is a schematic diagram of a typical liquid crystal display (LCD) panel.
Figure 2:
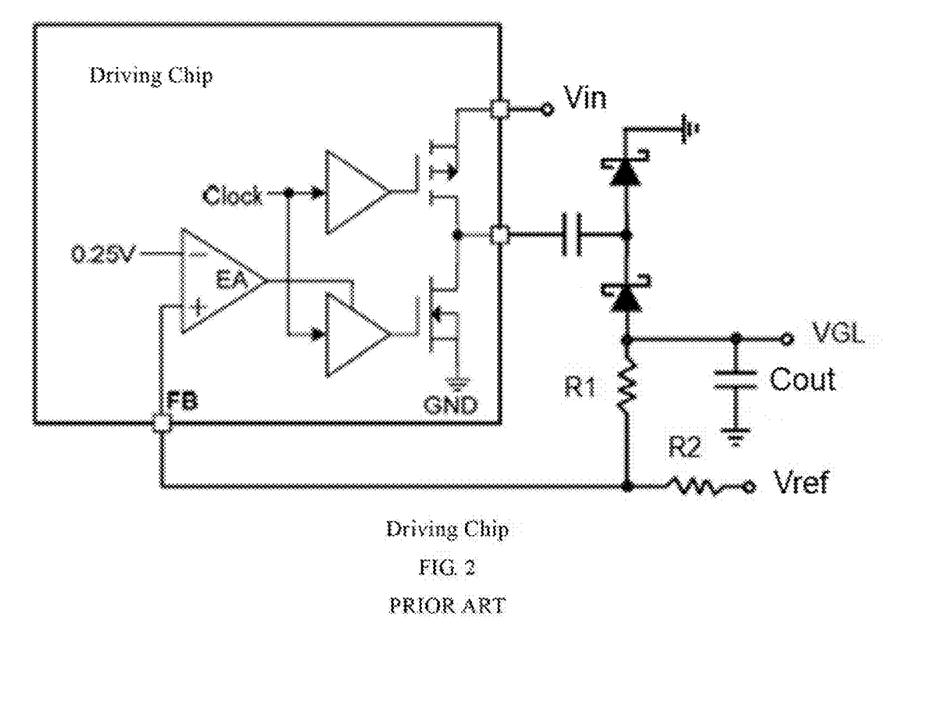
FIG. 2 is a schematic diagram of a driving chip in FIG. 1.
Figure 3:
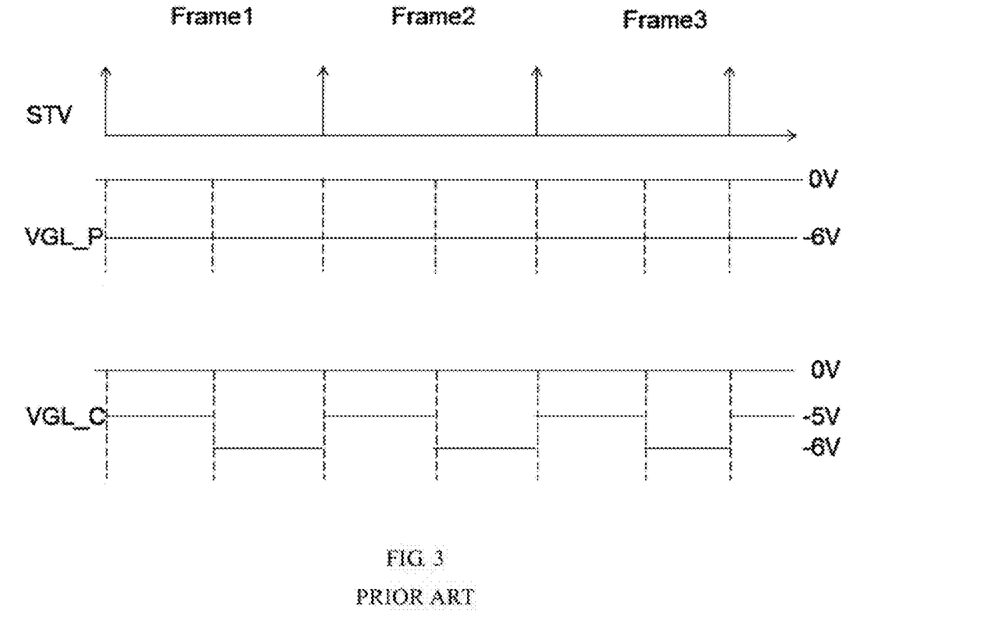
FIG. 3 is a schematic diagram of a driving waveform of a liquid crystal display (LCD) panel in FIG. 1.

For a liquid crystal display (LCD) panel driven by a thin film transistor-liquid crystal display (TFT-LCD), a circuit hoard driving a scan line may be omitted in order to save cost. Thus, a signal driving a gate electrode is sent to the scan line via cabling arranged in an inner part of the LCD panel. As shown in FIG. 1 and FIG. 2, an input voltage of a gate driver chip is generated by a driving chip (power integrated circuit card, power IC) of a control board, and is transmitted to a gate driver (GD) via a circuit board of a source driver (as shown X Board in FIG. 1), which needs the cabling to be arranged in the inner part of the LCD panel (wire on array: WOA). A resistance exists in the cabling, because the cabling is limited, by a layout and production process of the LCD panel, thus a voltage difference is generated in the cabling when current flows through the cabling. As shown in FIG. 3, STV represents a frame synchronizing signal. One cycle represents one frame. VGL_P represents a control voltage (VGL) generated in the control hoard, and VGL_C represents a voltage when the VGL reached the GD1 or GD3 on the LCD panel. The VGL_C is high on an upper half of one frame, where an obvious voltage difference is formed.

When the voltage difference is great, namely that the VGL voltage difference acting on two gate driver chips is greater, it leads to a color difference be displayed on the pictures of upper half and lower half of the LCD panel. An obvious horizontal dividing line is seen in a middle of the picture, which affects display quality.

SUMMARY

In view of the above-described, problems, the aim of the present disclosure is to provide a driving circuit of a liquid crystal display (LCD) panel, an LCD panel, and an LCD device which reduce a color difference of the LCD panel.

The aim of the present disclosure is achieved by the following technical scheme.

A driving circuit of the LCD panel. The driving circuit of the LCD panel comprises a compensation unit coupled with a scan line of the LCD panel and outputting N different driving voltages to different gate driver chips on a side of the LCD panel. Where N is equal to a number of the gate driver chips arranged on the side of the LCD panel, and as distance from a driving source of the driving voltages to the gate driver chip increases, absolute value of the driving voltage outputted by the compensation unit increases, so that the output voltages of different gate driver chips tend to be consonant.

Furthermore, the compensation unit comprises a switching nodule coupled with a sampling voltage. Where an output end of the switching module is correspondingly connected with N groups of voltage dividing circuits. Output ends of N groups of voltage dividing circuits are connected to an inner cabling of the LCD panel and coupled to the gate driver chips through the inner cabling.

The switching module switches N times within a time period of one frame. The sampling voltage is switched to different voltage dividing circuits to form different driving voltages. In the technical scheme, the switching module is used, and a same sampling voltage can be switched to the voltage dividing circuits. Different voltages are outputted to the gate driver chips by the voltage division action of the voltage dividing circuits. Counted from an upper part to a lower part of the LCD panel, as distance to the upper half of the LCD panel the gate driver chip becomes closer, absolute value of the obtained voltage increases. Contrarily, the voltage absolute value is lower. Thus, as long as design of the voltage dividing circuits is good, after loss by cabling arranged in an inner part of the LCD panel (wire on array: WOA), voltages of reaching each gate driver chip can be kept constant, thereby effectively reducing a color difference of different display areas.

Furthermore, a control end of the switching module is coupled to a time sequence control circuit of the driving circuit of the LCD panel. The time sequence control circuit identifies the gate driver chips executing scan work and outputs a control signal controlling the switching module to switch a corresponding voltage dividing circuits. The time sequence control circuit controls output signals of a scan line and a data line of the LCD panel. Thus, the time sequence control circuit provides the control signal to accurately determine an action state of the gate driver chips without use of additional detection circuit, thus facilitating simplification of the circuit.

Furthermore, there are two gate driver chips. The switching module comprises a first controllable switch turned on by a high level, signal and a second controllable switch turned on by a low level signal. Where input ends of the first controllable switch and the second controllable switch are coupled to the sampling voltage, output ends of the first controllable switch and the second controllable switch are correspondingly coupled to different voltage dividing circuits. The control ends of the first controllable switch and the second controllable switch are coupled to the time sequence control circuit. The control signal of the time sequence control circuit outputs a low-level signal and a high-level signal within the time period of one frame. A typical controllable switch is driven by the low-level or the high-level. A simple switching between the high-level signal and the low-level signal can be achieved using only one control line controlling the controllable switch when the two kinds of controllable switches are connected in parallel. The circuit is simple, high in reliability, and reduces cost.

Furthermore, the switching module further comprises a comparator. The control ends of the first controllable switch and the second controllable switch are coupled to the control signal of the time sequence control circuit by the comparator. A reference end of the comparator is coupled with a first reference voltage. A comparison end of the comparator is coupled to the control signal of the time sequence control circuit. The control signal is only compared with the first reference voltage by the comparator (CF), and if the control signal is higher or lower than the first reference voltage, two different levels are correspondingly outputted. Thus, even if the control signal slightly fluctuates, the output of the comparator (CF) is not affected unless a relationship between the control signal and the reference voltage is changed, thereby improving reliability.

Furthermore, two groups of voltage dividing circuits comprise a first voltage dividing circuit and a second voltage dividing circuit. One end of each of the first voltage dividing circuit and the second voltage dividing circuit is connected with a second reference voltage, and the other end is connected to the inner cabling of the LCD panel. The first voltage dividing circuit comprises a first resistor and a second resistor that are connected in series. The output end of the first controllable switch of the switching module is coupled between the first resistor and the second resistor. The second voltage dividing circuit comprises a third resistor and a fourth resistor that are connected in series. The output end of the second controllable switch of the switching module is coupled between the third resistor and the fourth resistor. This is a specified voltage dividing. Given the sampling voltage is FB, resistors of one of voltage dividing circuits are R1 and R2, the second reference voltage is VREF, (VREF−FB)/R2 is equal to (FB−VGL)/R1 according to a node current law, so VGL=FB−(VREF−FB)*(R1/R2). In the technical scheme, to different voltage dividing circuits, the VREF and FB are definite, and the VGLs are different when ratios of resistances of voltage dividing circuits are different. In this way, different VGLs are obtained by simply adjusting the resistance ratios. The technical scheme is simple, and reduces cost.

Furthermore, the control end of the switching module is coupled to the time sequence control circuit of the driving circuit of the LCD panel. The switching module comprises a first controllable switch turned on by high level signal and a second controllable switch turned on by low level signal. The input end of the switching module is coupled to the sampling voltage. The output end of the switching module is correspondingly coupled to different voltage dividing circuits. The driving circuit of the LCD panel further comprises a comparator. The reference end of the comparator is coupled with a reference voltage. The comparison end of the comparator is coupled to the output end of the time sequence control circuit. The output end of the comparator is coupled to the control ends of the first controllable switch and the second controllable switch. The time sequence control circuit outputs a low-level signal and a high-level, signal within the time period of one frame. The comparator controls the first controllable switch and the second controllable switch to alternately switch. The two groups of voltage dividing circuits comprise a first voltage dividing circuit and a second voltage dividing circuit. One end of each of the first voltage dividing circuit and the second voltage dividing circuit is connected with the reference voltage, and the other end is connected to the inner cabling of the LCD panel. The first voltage dividing circuit comprises a first resistor and a second resistor that are connected in series. The output end of the first controllable switch of the switching module is coupled between the first resistor and the second resistor. The second voltage dividing circuit comprises a third resistor and a fourth resistor that are connected in series. The output end of the second controllable switch of the switching module is coupled between the third resistor and the fourth resistor. The reference voltage is 1.25V. This is a specified driving circuit of the LCD panel.

An LCD device comprises the driving circuit of the LCD panel above.

A driving method of an LCD panel comprises:

A: outputting N different driving voltages to different gate driver chips on a side of the panel. N is equal to a number of the gate driver chips arranged on a side of the LCD panel, where as distance from a driving source of the driving voltages to the gate driver chip increases, absolute value of the driving voltage outputted increases.

Furthermore, in the step A, the sampling voltage is switched to N groups of voltage dividing circuits by the switching module. N groups of voltage dividing circuits output N different driving voltages coupled to different gate driver chips.

In research, as distance from the driving source of the driving voltages to the gate driver chip increases, the connected cabling becomes longer, and when the driving voltages are constant, voltage reduction becomes more serious. Thus, in the present disclosure, N groups of different driving voltages are outputted by the compensation unit, and are in one-to-one correspondence with N gate driver chips on the side of the LCD panel. As distance from the driving source of the driving voltages to the gate driver chip increases, absolute value of the corresponding driving voltage increases. Thus, the voltage reduction of the cabling can be offset partially or even completely, so that the output voltages of each gate driver chip tend to be consonant, and the color difference of the LCD panel is reduced.

DETAILED DESCRIPTION

The present disclosure discloses a liquid crystal display (LCD) device. The LCD device comprises a driving circuit of an LCD panel. The driving circuit of the LCD panel comprises a compensation unit coupled with a scan line of the LCD panel and outputting N different driving voltages to different gate driver chips on a side of the LCD panel. The N is the number of the gate driver chips arranged on a side of the LCD panel. As distance from a driving source of the driving voltages to the gate driver chip increases, the absolute value of the driving voltage outputted by the compensation unit increases, so that the output voltages of different gate driver chips tend to be consonant.

In research, as distance from the driving source of the driving voltages to the gate driver chip increases, the connected cabling becomes longer, and when the driving voltages are constant, voltage reduction becomes more serious. Thus, in the present disclosure, N groups of different driving voltages are outputted by the compensation unit, and are in one-to-one correspondence with N gate driver chips on the side of the LCD panel. As distance from the driving source of the driving voltages to the gate driver chip increases, the absolute value of the corresponding driving voltage increases. Thus, the voltage reduction of the cabling can be offset partially or even completely, so that the output voltages of each gate driver chip tend to be consonant, and the color difference of the LCD panel is reduced.

The present disclosure is further described in accordance with the figures and exemplary examples using N=2 as an example.

An LCD device in the example comprises an LCD panel. Two gate driver chips are arranged on both sides of the LCD panel. A plurality of source driver chips are arranged at an upper part of the LCD panel. The source driver chips are controlled by a source driver circuit board. The drive of the entire LCD panel is realized by a control circuit board. The control circuit board is configured with a driving chip and a time sequence control circuit. It should be understood that the time sequence control circuit can also be integrated into the driving chip. A switching module of the present disclosure is arranged on the control circuit board, and can also be integrated into the driving chip.

Figure 4:
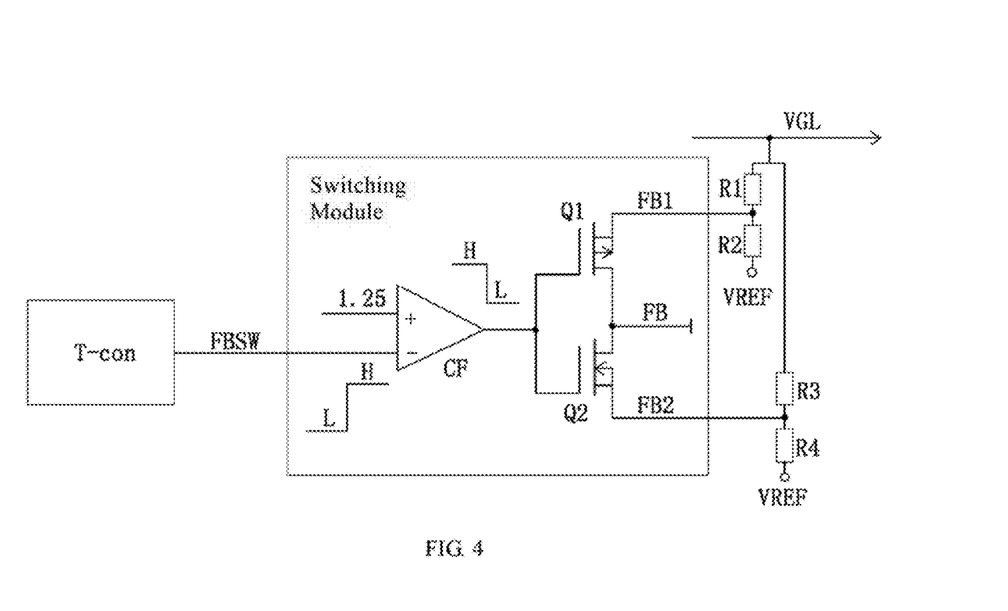
FIG. 4 is a schematic diagram of an example of the present disclosure.

As shown in FIG. 4, a control end of the switching, module is coupled to the time sequence control circuit (T-con). The time sequence control circuit outputs a control signal FBSW. The control signal outputs a low-level signal and a high-level signal within the time period of one frame to control switching of the switching module. The time sequence control circuit controls output signals of a scan line and a data line of the LCD panel. Thus, the time sequence control circuit provides the control signal to accurately determine an action state of the gate driver chips without use of an additional detection circuit, thus facilitating simplification of the circuit.

The switching module comprises a first controllable switch Q1 turned on by a high level signal (logic 1), and a second controllable switch Q2 turned on by a low level signal (logic 0). An input end of the switching module is coupled to a sampling voltage FB. An output end of the switching module is coupled to a first voltage dividing circuit and a second voltage dividing circuit. The control end of the switching module is coupled to the time sequence control circuit (T-con) by a comparator CF. A reference end of the comparator (CF) is coupled to a first reference voltage. A comparison end of the comparator (CF) is coupled to the control signal (FBSW) of the time sequence control circuit. An output end of the comparator (CF) is coupled to a control end of the first controllable switch (Q1) and the second controllable switch (Q2). The control signal is only compared with the first reference voltage by the comparator (CF), and if the control signal is higher or lower than the first reference voltage, two different levels are correspondingly outputted. Thus, even if the control signal slightly fluctuates, the output of the comparator (CF) is not affected unless a relationship between the control signal and the reference voltage is changed, thereby improving reliability.

Two groups of voltage dividing circuits of the example comprise the first voltage dividing circuit and the second voltage dividing circuit. One end of each of the first voltage dividing circuit and the second voltage dividing circuit is connected to a second reference voltage VREF, and the other end of each of the first voltage dividing, circuit and the second voltage dividing circuit is connected to the inner cabling of the LCD panel. The first voltage dividing circuit comprises a first resistor (R1) and a second resistor (R2) that are connected in series. An output end of the first controllable switch (Q1) of the switching module is coupled between the first resistor (R1) and the second resistor (R2). The second voltage dividing circuit comprises a third resistor (R3) and a fourth resistor (R4) that are connected in series. An output end of the second controllable switch (Q2) of the switching module is coupled between the third resistor (R3) and the fourth resistor (R4). The sampling voltage (FB) comprises a voltage FB1 and a voltage FB2, the FB1 is obtained through voltage division and sampling of the first resistor (R1) and the second resistor (R2) of the first voltage dividing circuit, the FB2 is obtained through voltage division and sampling of the third resistor (R3) and the fourth resistor (R4) of the second voltage dividing circuit. To simplify design, the second reference voltage (VREF) and the first reference voltage can be kept constant. For 1.25 V shown in FIG. 4, a voltage of 1.25 V can be conveniently obtained from a typical circuit without increasing complexity of the circuit.

Figure 5:
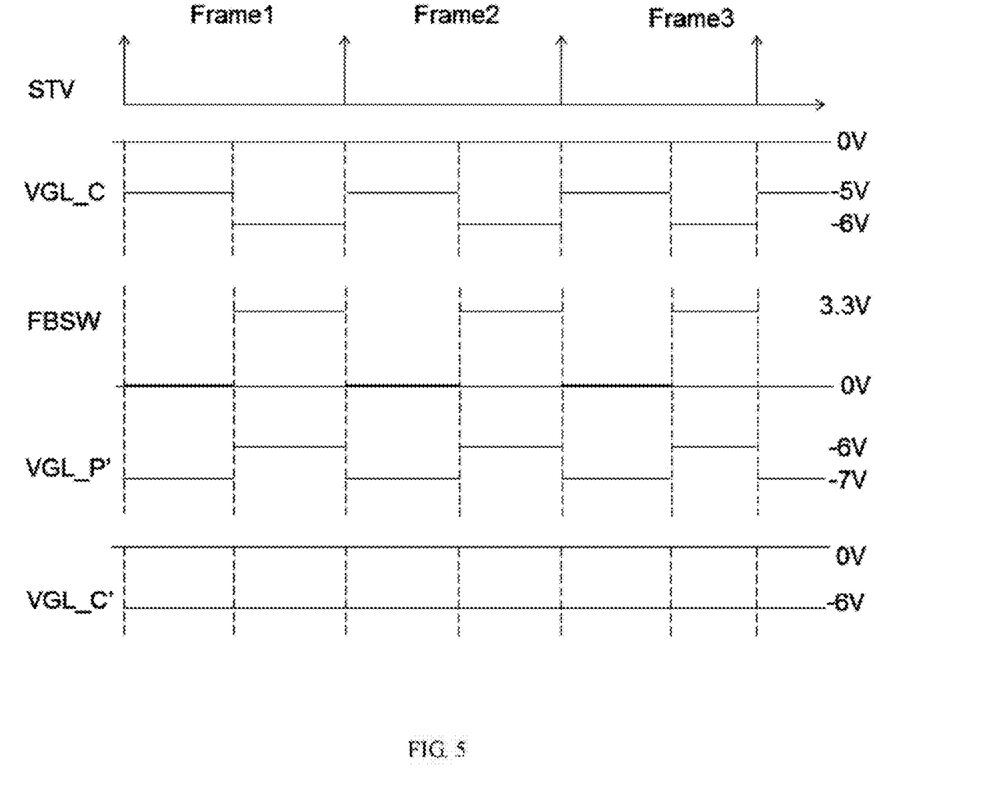
FIG. 5 is a schematic diagram of a driving waveform of an example of the present disclosure.
Figure 6:
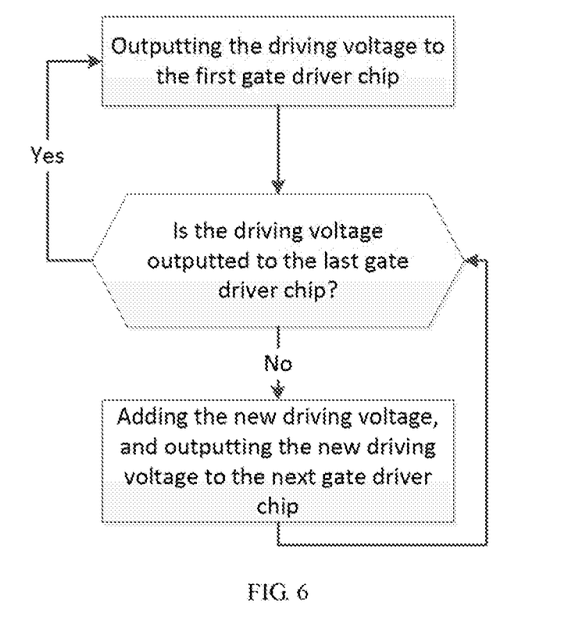
FIG. 6 is a flow chart of a driving method of an LCD panel of the present disclosure.

As shown in FIG. 5, when the FBSW is the low level (L) signal, the comparator (CF) outputs the high level (H) signal. At this moment, the second controllable switch (Q2) is on. The switching module switches the sampling voltage (FR) to the second voltage dividing circuit and outputs the FB2. A control voltage (VGL_P') generated on the control circuit board, where VGL_P'=FB−(VREF−FB)*(R3/R4). When the FBSW is the high level (H) signal, the comparator (CF) outputs the low level (L) signal. At this moment, the first controllable switch (Q1) is on. The switching module switches the sampling voltage (FB) to the first voltage dividing circuit and outputs the FB1. At this moment, VGL_P'=FB−(VREF−FB)*(R1/R2). As long as the voltage reduction caused by the inner cabling of the LCD panel is calculated, ratios of R3/R4 and R1/R2 can be calculated according to the voltage reduction. The VGL_P' of two different voltage reduction passes the inner cabling of the LCD panel and reaches a gate driver (GD) 1 or GD3, which forms a voltage VGL_C', the VGL_C' of GD1 or GD3 is constant with the VGL_C' of GD2 or GD4, thus forming stable voltage.

A typical controllable switch is driven by the low-level or the high-level. A simple switching between the high-level signal and the low-level signal can be achieved using only one control line controlling the controllable switch when the two kinds of controllable switches are connected in parallel. The circuit is simple, high in reliability, and reduces cost. However, the present disclosure is not limited to the N=2 technical scheme. When N is larger than or equal to 3, simply switching the controllable switch is not useful. A multiple-channels chip can be used. The multiple-channels chip has a plurality of output pins. Each pin can be coupled to a group of voltage dividing circuit. A switching among a plurality of output pins is controlled by a digital signal.

The present disclosure also discloses a driving method of an LCD panel, comprising:

A: outputting N different driving voltages to different gate driver chips on a side of the LCD panel. The N is equal to the number of the gate driver chips arranged on the side of the LCD panel, as distance from the driving source of the driving voltages to the gate driver chip increases, absolute value of the driving voltage outputted increases.

Furthermore, in the step A, a sampling voltage is switched to N groups of voltage dividing circuits by a switching module. N groups of voltage dividing circuit output N different driving voltages coupled to different gate driver chips.

The present disclosure is described in detail in accordance with the above contents with the specific exemplary examples, in the examples, the same voltage is converted into different driving voltages by different voltage dividing circuits. Certainly, one voltage source can directly output different voltages as driving voltages. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A driving circuit of a liquid crystal display (LCD) panel, comprising:
   a compensation unit coupled with a scan line of the LCD panel and outputting N different driving voltages to different gate driver chips on a side of the LCD panel, wherein N is equal to a number of the gate driver chips arranged on the side of the LCD panel, wherein the compensation unit comprises a switching module coupled with a sampling voltage, an output end of the switching module is correspondingly connected with N groups of voltage dividing circuits, and output ends of the N groups of voltage dividing circuits are connected to an inner cabling of the LCD panel and coupled to the gate driver chips through the inner cabling; wherein the switching module switches N times within a time period of one frame, and the sampling voltage is switched to different voltage dividing circuits to form different driving voltages, wherein a control end of the switching module is coupled to a time sequence control circuit of the driving circuit of the LCD panel, the time sequence control circuit identifies the gate driver chips executing scan work and outputs a control signal controlling the switching module to switch to a corresponding voltage dividing circuit, wherein there are two gate driver chips; the switching module comprises a first controllable switch turned on by a high level signal and a second controllable switch turned on by a low level signal, input ends of the first controllable switch and the second controllable switch are coupled to the sampling voltage, output ends of the first controllable switch and the second controllable switch are correspondingly coupled to different voltage dividing circuits, control ends of the first controllable switch and the second controllable switch are coupled to the time sequence control circuit; the control signal of the time sequence control circuit outputs a low-level signal and a high-level signal within the time period of one frame.

2. The driving circuit of the liquid crystal display (LCD) panel of claim 1, wherein the switching module further comprises a comparator; the control ends of the first controllable switch and the second controllable switch are coupled to the control signal of the time sequence control circuit by the comparator; a reference end of the comparator is coupled with a first reference voltage a comparison end of the comparator is coupled to the control signal of the time sequence control circuit.

3. The driving circuit of the liquid crystal display (LCD) panel of claim 1, wherein two groups of voltage dividing circuits comprise a first voltage dividing circuit and a second voltage dividing circuit; one end of each of the first voltage dividing circuit and the second voltage dividing circuit is connected with a second reference voltage, and the other end is connected to the inner cabling of the LCD panel; the first voltage dividing circuit comprises a first resistor and a second resistor that are connected in series, the output end of the first controllable switch of the switching module is coupled between the first resistor and the second resistor; the second voltage dividing circuit comprises a third resistor and a fourth resistor that are connected in series; the output end of the second controllable switch of the switching module is coupled between the third resistor and the fourth resistor.

4. The driving circuit of the liquid crystal display (LCD) panel of claim 2, wherein two groups of voltage dividing circuits comprise a first voltage dividing circuit and a second voltage dividing circuit; one end of each of the first voltage dividing circuit and the second voltage dividing circuit is connected with a second reference voltage, and the other end is connected to the inner cabling of the LCD panel; the first voltage dividing circuit comprises a first resistor and a second resistor that are connected in series, the output end of the first controllable switch of the switching module is coupled between the first resistor and the second resistor; the second voltage dividing circuit comprises a third resistor and a fourth resistor that are connected in series; the output end of the second controllable switch of the switching module is coupled between the third resistor and the fourth resistor.

5. A liquid crystal display (LCD) device, comprising:

a driving circuit of an LCD panel, wherein the driving circuit of the LCD panel comprises a compensation unit coupled with a scan line of the LCD panel and outputting N different driving voltages to different gate driver chips on a side of the LCD panel, N is equal to a number of the gate driver chips arranged on the side of the LCD panel, wherein the compensation unit comprises a switching module coupled with a sampling voltage, an output end of the switching module is correspondingly connected with N groups of voltage dividing circuits, and output ends of the N groups of voltage dividing circuits are connected to an inner cabling of the LCD panel and coupled to the gate driver chips through the inner cabling; wherein the switching module switches N times within a time period of one frame, and the sampling voltage is switched to different voltage dividing circuits to form different driving voltages, wherein a control end of the switching module is coupled to the time sequence control circuit of the driving circuit of the LCD panel, the time sequence control circuit identifies the gate driver chips executing scan work and outputs a control signal is outputted for controlling the switching module to switch to a corresponding voltage dividing circuit, wherein there are two gate driver chips; the switching module comprises a first controllable switch turned on by a high level signal and a second controllable switch turned on by a low level signal, input ends of the first controllable switch and the second controllable switch are coupled to the sampling voltage, output ends of the first controllable switch and the second controllable switch are correspondingly coupled to different voltage dividing circuits control ends of the first controllable switch and the second controllable switch are coupled to the time sequence control circuit; the control signal of the time sequence control circuit outputs a low-level signal and a high-level signal within the time period of one frame.

6. The liquid crystal display (LCD) device of claim 5, wherein the switching module further comprises a comparator; the control ends of the first controllable switch and the second controllable switch are coupled to the control signal of the time sequence control circuit by the comparator; a reference end of the comparator is coupled with a first reference voltage; a comparison end of the comparator is coupled to the control signal of the time sequence control circuit.

7. The liquid crystal display (LCD) device of claim 5, wherein two groups of voltage dividing circuits comprise a first voltage dividing circuit and a second voltage dividing circuit; one end of each of the first voltage dividing circuit and the second voltage dividing circuit is connected with a second reference voltage, and the other end is connected to the inner cabling of the LCD panel; the first voltage dividing circuit comprises a first resistor and a second resistor that are connected in series, the output end of the first controllable switch of the switching module is coupled between the first resistor and the second resistor; the second voltage dividing circuit comprises a third resistor and a fourth resistor that are connected in series; the output end of the second controllable switch of the switching module is coupled between the third resistor and the fourth resistor.

8. The liquid crystal display (LCD) device of claim 6, wherein two groups of voltage dividing circuits comprise a first voltage dividing circuit and a second voltage dividing circuit; one end of each of the first voltage dividing circuit and the second voltage dividing circuit is connected with a second reference voltage, and the other end is connected to the inner cabling of the LCD panel; the first voltage dividing circuit comprises a first resistor and a second resistor that are connected in series, the output end of the first controllable switch of the switching module is coupled between the first resistor and the second resistor; the second voltage dividing circuit comprises a third resistor and a fourth resistor that are connected in series; the output end of the second controllable switch of the switching module is coupled between the third resistor and the fourth resistor.

9. A driving circuit of a liquid crystal display (LCD) panel, comprising:
 a compensation unit coupled with a scan line of the LCD panel and outputting N different driving voltages to different gate driver chips on a side of the LCD panel, wherein N is equal to a number of the gate driver chips arranged on the side of the LCD panel,
 wherein the compensation unit comprises a switching module coupled with a sampling voltage, an output end of the switching module is correspondingly connected with N groups of voltage dividing circuits, and output ends of the N groups of voltage dividing circuits are connected to an inner cabling of the LCD panel and coupled to the gate driver chips through the inner cabling, wherein the switching module switches N times within a time period of one frame, and the sampling voltage is switched to different voltage dividing circuits to form different driving voltages,
 wherein a control end of the switching module is coupled to a time sequence control circuit of the driving circuit of the LCD panel, the switching module comprises a first controllable switch turned on by a high level signal and a second controllable switch turned on by a low level signal, an input end of the switching module is coupled to the sampling voltage, an output end of the switching module is correspondingly coupled to different voltage dividing circuits; the driving circuit of the LCD panel further comprises a comparator, a reference end of the comparator is coupled with a reference voltage, a comparison end of the comparator is coupled to an output end of the time sequence control circuit, an output end of the comparator is coupled to control ends of the first controllable switch and the second controllable switch; the time sequence control circuit outputs a low-level signal and a high-level signal within the time period of one frame and controls the first controllable switch and the second controllable switch to alternately switch by the comparator; two groups of voltage dividing circuits comprise a first voltage dividing circuit and a second voltage dividing circuit, one end of each of the first voltage dividing circuit and the second voltage dividing circuit is connected with the reference voltage, and the other end is connected to the inner cabling of the LCD panel; the first voltage dividing circuit comprises a first resistor and a second resistor that are connected in series, the output end of the first controllable switch of the switching module is coupled between the first resistor and the second resistor, the second voltage dividing circuit comprises a third resistor and a fourth resistor that are connected in series, the output end of the second controllable switch of the switching module is coupled between the third resistor and the fourth resistor; the reference voltage is 1.25 V.

\* \* \* \* \*